(12) United States Patent
Gerth et al.

(10) Patent No.: US 12,120,085 B1
(45) Date of Patent: *Oct. 15, 2024

(54) SOCIAL QUALITY REVIEW

(71) Applicant: United Services Automobile Association (USAA), San Antonio, TX (US)

(72) Inventors: William Gerth, Boerne, TX (US); Patrick Freshwater, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 252 days.

This patent is subject to a terminal disclaimer.

(21) Appl. No.: 17/223,801

(22) Filed: Apr. 6, 2021

Related U.S. Application Data

(63) Continuation of application No. 16/101,705, filed on Aug. 13, 2018, now Pat. No. 10,992,631.

(60) Provisional application No. 62/546,125, filed on Aug. 16, 2017.

(51) Int. Cl.
| | |
|---|---|
| *H04L 51/52* | (2022.01) |
| *G06Q 50/00* | (2024.01) |
| *H04L 51/212* | (2022.01) |
| *H04L 67/50* | (2022.01) |

(52) U.S. Cl.
CPC .......... *H04L 51/52* (2022.05); *G06Q 50/01* (2013.01); *H04L 51/212* (2022.05); *H04L 67/535* (2022.05)

(58) Field of Classification Search
CPC ............. H04M 3/5191; H04M 3/5175; H04M 3/5141; H04L 51/02; G06F 40/30
See application file for complete search history.

(56) References Cited

U.S. PATENT DOCUMENTS

| | | | |
|---|---|---|---|
| 8,737,599 B2* | 5/2014 | Kannan ............... | H04M 3/5175 379/265.09 |
| 2007/0198510 A1 | 8/2007 | Ebanks | |
| 2011/0265011 A1 | 10/2011 | Taylor et al. | |
| 2013/0129076 A1* | 5/2013 | Kannan ............... | H04M 3/5191 379/265.09 |
| 2014/0188552 A1* | 7/2014 | Chan .................. | G06Q 30/0269 705/7.29 |
| 2016/0127553 A1* | 5/2016 | McCormack ....... | H04M 7/0045 379/265.03 |
| 2016/0189558 A1* | 6/2016 | McGann .................. | G09B 5/06 434/219 |
| 2016/0330084 A1* | 11/2016 | Hunter .................. | G06F 16/957 |
| 2018/0007205 A1* | 1/2018 | Klein ...................... | H04L 67/01 |
| 2018/0007206 A1* | 1/2018 | Klein .................. | H04M 3/5166 |
| 2019/0146647 A1* | 5/2019 | Ramchandran ......... | G06F 40/35 715/758 |
| 2019/0245975 A1* | 8/2019 | Konig ................. | H04M 7/0045 |

\* cited by examiner

*Primary Examiner* — Mahran Y Abu Roumi
(74) *Attorney, Agent, or Firm* — BakerHostetler

(57) ABSTRACT

Systems and methods provide quality analysis related to member service representatives and interactions communicating with users over social media networks. The systems and methods can generate an interaction quality score between a member services representative and a user of a social media network by aggregating a tone score and an execution score based on the interaction data.

18 Claims, 20 Drawing Sheets

Social Conversation Evaluation #1

Conversation Details:

Platform: Twitter      Date: June 4, 2017

Duration: (5min.) 3:50 pm – 3:55 pm

Re: Bank Customer Service Frustration      Member:

Super upset right now! You'd think a bank without ANY branches would offer 24/7/365 service! #frackingdoublecharges!!!

Jun 4 at 3:50 PM   7 tags

Replying To:
can you please DM us with the phone number associated with your membership and more information? We'd like to help.

Jun 4 at 3:55 PM   Add tags

Elements of Social Quality Review

| Element | Rating |
|---|---|
| Smart | YELLOW |
| Warmth & Empathy | RED |
| Genuine | YELLOW |
| Grounded | YELLOW |
| Disciplined & Secure | GREEN |
| Complete | YELLOW |

FIG. 6A

Key Observations and Notes

1. Sentence structure can make the difference
2. Lost opportunity to assist due to no confidence in response
3. Need to ask for clarifying details prior to asking to DM

FIG. 6E

Social Conversation Evaluation #2

Conversation Details:

Platform: Facebook  Date: May 21, 2017
Duration: (1 hr 48 min) 11:40 AM - 1:28 PM Re: P&C Member disputing C.L.U.E. Report –

I have held my vehicle insurance with you for 5 plus years. Last August I had someone get into my unlocked vehicle take a few items out of it, I notified you since I was filing a police report to replace my IDs. Nothing major was taken, no claim needed to be filed. Yet now I am finding out there was a claim filed not only my vehicle but my renters. I am getting screwed over because of a representatives mistake. I just purchased a new vehicle and very likely will not be using to insure it after I got this mess cleared it.

Good day Ashley,

An insured has duty under the contract to report when a loss has occurred within a timely manner as the insurer have an obligation to document such occurrences. Based on the limited information you shared in your post, it sounds as if the items stolen were minimal in value thus no payout on the claim was made. Can you expound upon why you feel USAA provided you with poor service? If you could private message me your phone number, I would like to take a closer look at the claim reports as well. - Ina sent you a private message.

Elements of Social Quality Review

| | |
|---|---|
| Smart | GREEN |
| Warmth & Empathy | RED |
| Genuine | RED |
| Grounded | RED |
| Disciplined & Secure | GREEN |
| Complete | RED |

FIG. 7A

Key Observations and Notes

1. Responses lacking empathy and genuineness can turn a potentially positive "social experience" into one that sounds scripted and corporate.

2. Continue emphasis on Closing the Loop when appropriate. Make it second nature.

FIG. 7E

Social Conversation Evaluation #3

Conversation Details: 13854357

Platform: Facebook  Date: June 5, 2017
Duration:

Re: Bank – Unhappy manufactured home financing not available with

Elements of Social Quality Review

| Element | Rating |
|---|---|
| Smart | YELLOW |
| Warmth & Empathy | YELLOW |
| Genuine | YELLOW |
| Grounded | GREEN |
| Disciplined & Secure | GREEN |
| Complete | GREEN |

FIG. 8A

Tone Evaluation (Cont'd)

Genuine (1) Utilized members own words
(2) Acknowledged we do not finance manufactured homes however still offered to discuss eligible properties (A)
(3) Expressing "excitement" can seem scripted when the poster provided a neutral statement about what cannot finance (B)

Grounded (1) Portrayed professionalism at all times
(2) Displayed commitment to serving members (C)

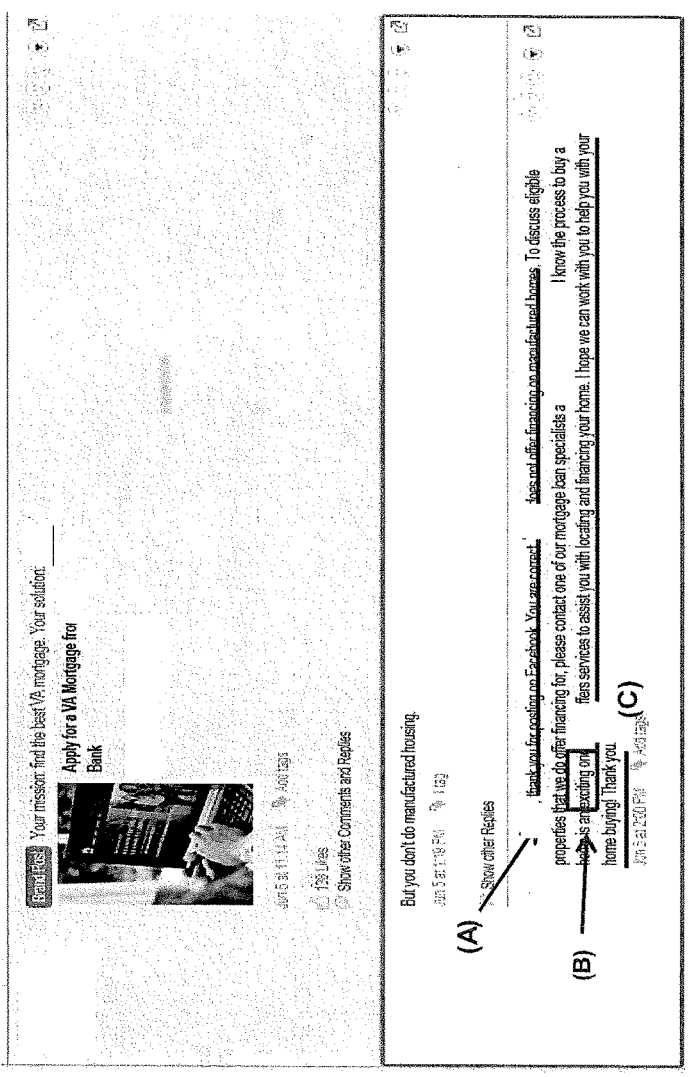

FIG. 8C

Key Observations and Notes

1. Provided immediate and concise response to member.

2. Empathize with member regarding their original comment and explore acknowledgment with an open-ended question.

3. Member was provided closure and option within channel.

FIG. 8E

SOCIAL QUALITY REVIEW

CROSS-REFERENCE TO RELATED APPLICATION

This patent application claims the benefit to and is a continuation application of U.S. patent Ser. No. 16/101,705, filed Aug. 13, 2018, which claims priority to and the benefit of provisional patent application 62/546,125 filed Aug. 16, 2017, which is incorporated herein by reference in its entirety.

TECHNICAL FIELD

The subject matter of this disclosure generally relates to electronic communications, and more particularly toward evaluating electronic communications over social network channels according to one or more criteria.

BACKGROUND

Customer service communications can be complex to manage. Fields in which service providers manage multiple accounts or involve large values can create challenging communication asymmetries between service providers and customers. Customers also expect personalized service, especially in relation to high-value relationships (a designation which may be relative and subjective to the customer).

The manner in which users interact with service providers is making management of communication more varied and complex. Social media is a major driver of communication. While techniques for handling in-person or telephone customer service are long-studied, the idiosyncrasies of managing multiple disparate social media channels which involve current customers, past customers, prospective customers, competitors, and unrelated third parties adds new dimensions of complexity. More, many types of social media conversations are publicly viewable, and so the context and/or content of communications must be considered for broader audiences than communication channels like e-mail or voice calls while remaining responsive to the initiating party. The various platforms and types of communication also create different technological challenges relating to multi-platform interoperability, analysis of language, following rules, et cetera.

It would accordingly benefit service providers to develop techniques for evaluating interactions over social media channels to ensure a high level of service across all channels and platforms, message and service consistency, proper handling of complex and personal issues, adherence to protocols, and exercise of other controls based on the organization and situation.

SUMMARY

In an embodiment, a system comprises a social network interface module configured to receive interaction data from at least one social network; an interaction database configured to store the interaction data; a scoring module configured to generate an interaction quality score between a member services representative and a user of a social media network by aggregating a tone score and an execution score based on the interaction data, the scoring module comprising: a tone module of the scoring module configured to generate the tone score by analyzing the interaction data; and an execution module of the scoring module configured to generate the execution score by analyzing the interaction data; and a portal module configured to provide the interaction quality score to at least the member services representative.

In an embodiment, a method comprises: identifying a social communication between a member services representative and a user of a social network; storing interaction data in an interaction database; gathering interaction data from the social communication; generating a tone score by analyzing the interaction data; generating an execution score by analyzing the interaction data; generating an interaction quality score based on the tone score and the execution score; and providing a portal module configured to provide the interaction quality score to one or more users.

In an embodiment, a non-transitory computer-readable medium storing instructions that when executed by a processor effectuate: a social network interface module configured to receive interaction data from at least one social network; an interaction database configured to store the interaction data; a scoring module configured to generate an interaction quality score between a member services representative and a user of a social media network by aggregating a tone score and an execution score based on the interaction data, the scoring module comprising: a tone module of the scoring module configured to generate the tone score by analyzing the interaction data; and an execution module of the scoring module configured to generate the execution score by analyzing the interaction data; and a portal module configured to provide the interaction quality score to one or more users.

Additional and alternative aspects will be apparent on review of other portions of this disclosure.

BRIEF DESCRIPTION

So that those having ordinary skill in the art, to which the present disclosure pertains, will more readily understand how to employ the novel system and methods of the present disclosure, certain illustrated embodiments thereof will be described in detail herein-below with reference to the drawings, wherein:

FIGS. 6A to 6E illustrate aspects of a user interface disclosed herein;

FIGS. 7A to 7E illustrate aspects of a user interface disclosed herein; and FIGS. 8A to 8E illustrate aspects of a user interface disclosed herein.

DETAILED DESCRIPTION

Aspects herein generally relate to providing feedback on the quality of interactions between member services representatives (MSRs) and other parties over social network channels. These can be used to train and evaluate MSRs, manage brand image, determine trends for MSRs or groups of MSRs, and provide other reports or feedback as disclosed herein. Further aspects disclosed herein describe aspects of user interfaces used in training of or real-time management or assistance to MSRs. Scoring and reviewing can be conducted periodically, regularly, in an ongoing manner, et cetera. Additional information such as measurement of social engagement can also be developed.

Aspects herein can be used to identify trends and friction points (e.g., issues or parts of conversations which are more challenging or less likely to result in resolution and satisfaction), develop training, identify opportunities for process improvement, and increase service levels. Best practices, follow-on social media engagement plans, and risk management can also benefit from data and scoring developed through the disclosures.

As used herein, a "social media network" or similar terminology (e.g., "social media platform") can be any website, service, or product, whether free or paid, that allows users to register accounts or handles and contribute content. These can include, but are not limited to, Facebook, Google+, Instagram, Twitter, Tumblr, Snapchat, Weibo, Myspace, Nextdoor, and others. Professional networks such as LinkedIn, Vault, or GlassDoor are considered "social media networks" for purposes of this disclosure, as are other interactive sites accepting user content such as YouTube, Reddit, Vine, et cetera. Specialty social networks with subject matter focuses, such as UnTappd or Cor.kz for libations, can also be used for data collection even if no social media account is maintained on the network. Proprietary social networks such as a corporate app or message board are also included.

"Member Service Representatives" (MSRs) are parties working on behalf of an entity to external third parties. MSRs represent the entity providing sales, customer support, and other information. The third parties may be clients, customers, partners, or other parties with which the entity has a business relationship. In embodiments, the third parties may be users of a social media network with no past or present relationship with the entity.

Figure 1:
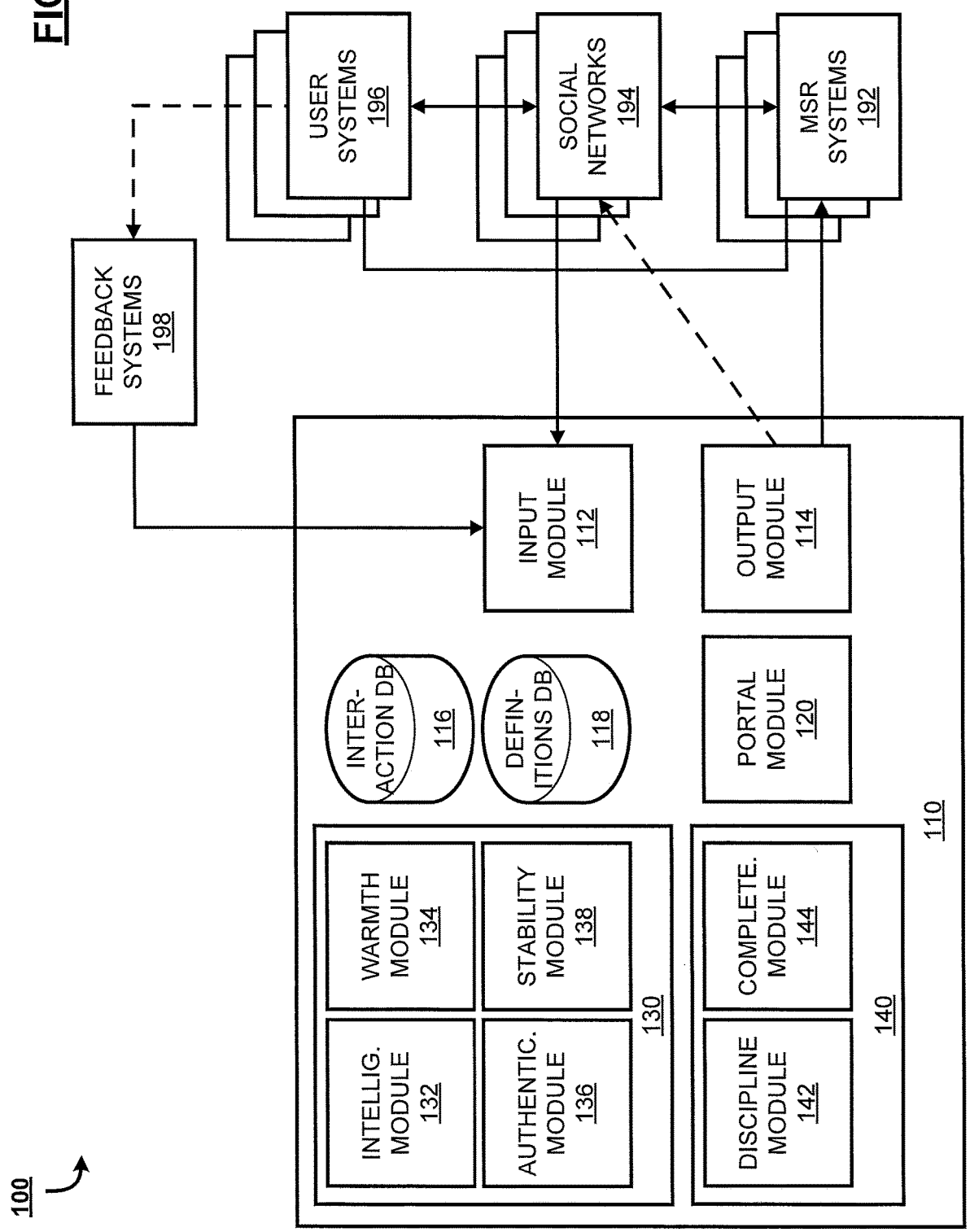
FIG. 1 illustrates a block diagram of an example system of the disclosure.

FIG. 1 illustrates an example system 100 including social quality review platform 110. System 100 also includes social networks 194 which are communicatively coupled with MSR systems 192 and user systems 196, as well as social quality review platform 110. System 100 can also include feedback systems 198, which can be communicatively coupled with user systems 196 and/or any other portion, for providing feedback from users based on feedback solicited or volunteered (e.g., survey input provided immediately after interaction, survey input provided after a delay following interaction, feedback sent through forms or other channels).

Social quality review platform 110 includes input module 112. Input module 112 is configured to receive information from at least social networks 194. Information can include interaction data related to interactions between MSRs using MSR systems 192 and other parties using user systems 196 over social networks 194. Interaction data can be used to identify a social interaction, then capture data related to the social interaction including but not limited to text data and multimedia data. Input module 112 can include, utilize, or interact with various software or hardware components for facilitating communication with social networks 194. Such components can include dedicated or virtualized network elements; various interfaces (e.g., Application Programming Interfaces associated with social networks 194); proprietary scripts, modules, or software; auto-discovery components; content processing capable of receiving, converting, harvesting, crawling, or scraping social networks 194 using web browsers, applications, or other interfaces; natural language processing; translation services; machine learning or artificial intelligence for analyzing communications or technical aspects of social networks 194; plugins; et cetera.

Interaction database 116 stores interaction data related to one or more interactions between MSRs and other parties. This can include text and/or multimedia in native or standard formats. In embodiments, interaction database 116 can also store data derived from interaction data, including interaction quality scores and components of interaction quality scores, as well as aggregated score information and statistics. Interaction database 116 can store information according to a variety of fields, including MSR, customer, group, line of business, issue/topic or question, time, channel, social network, urgency, escalation, quality score (discussed elsewhere herein), date, time, duration, or variants or plurals thereof.

Definitions database 118 stores definitions, variables, values, and rules (e.g., quantitative mathematical rules, qualitative business rules) for producing interaction quality scores (based on, e.g., communications sent by the MSR). The information stored in definitions database 118 can be updated (e.g., in response to feedback from feedback systems 198, in response to score values produced, et cetera) automatically or manually.

Output module 114 provides feedback to MSR systems 192, and may in embodiments also interact with social networks 194 (e.g., by posting information, pre-populating forms, or performing other actions). Output module 114 can show scores or indicators to MSRs during or immediately after a conversation, and may in embodiments provide details or suggested interaction to increase the scores or better execute MSR duties.

Portal module 120 provides a portal through which MSRs, managers, or other parties may access interaction data and interaction quality scores. In embodiments, portal module 120 can provide, prepare, or send reports to one or more parties interacting with portal module 120. Reports can relate to a particular MSR or group of MSRs, a particular customer or group of customers, a particular issue or group of issues, et cetera, or any field or fields which can be selected, sorted, correlated, and so forth.

Interactions between MSRs and other parties over social media channels can be evaluated and reviewed according to various criteria. In embodiments, the interaction data evaluated are communications sent by the MSR (e.g., messages, posts, et cetera, sent to a third party). In embodiments, interaction data can include metrics in addition to the messages themselves, such as response time. In embodiments, criteria can relate to tone (e.g., the tone of the conversation) and execution (e.g., success and adherence to rules). Categories of scores or sub-scores can be used to generate an interaction quality score, grade, or review of the interaction based on interaction data.

In an embodiment, tone module 130 can generate one or more score components based on tone based on interaction data. Tone module 130 can include or interact with intelligence module 132, warmth module 134, authenticity module 136, and grounded module 138.

Intelligence module 132 determines whether the interaction has a "smart" tone and conveys knowledge and experience. Details or indicators scored can include matching the MSR to the products, services, and issues discussed at the right point in the conversation, and whether the MSR's responses are accurate and comprehensive to meet servicing needs. The intelligence module 132 can also assess whether the MSR is confident with or in the tools available and handling of the issue. Simplicity, intelligence, clarity, unbiasedness, and crispness improve intelligence scores, while redundancy, corporate language, colloquialisms, and clichés diminish intelligence scores. Quantification, or identification of a quality level, by intelligence module 132 can rely on scripts, word recognition (individually or in phrases), real-time user responses, survey responses, natural language processing, artificial intelligence or machine learning, et cetera, in conjunction with definitions database 118 or using separate functionality.

Warmth module 134 determines whether the MSR conveys empathy, compassion, sincerity, and care. Avoiding robotic conversation and expressing true concern with helping or answering can be evaluated based on the language used and the timing of delivery. To score well in warmth, the MSR should be approachable and acknowledge specific details and reflect the specific language of the party with which the MSR interacts over social channels. Being considerate, personal, relevant, and truthful, and recognizing and sharing the feelings of the user, improve warmth scoring, while communicating in a robotic or "canned" manner diminishes warmth scores. Quantification, or identification of a quality level, by warmth module 134 can rely on scripts, word recognition (individually or in phrases), real-time user responses, survey responses, natural language processing, artificial intelligence or machine learning, et cetera, in conjunction with definitions database 118 or using separate functionality.

Authenticity module 136 determines whether an interaction has a genuine, non-scripted, and open-ended conversation to convey honesty and trustworthiness. Reliance on facts, proof, and delivering on representations influences a score developed by authenticity module 136. Honesty, transparency, openness, directness, and truthfulness improve authenticity scores, as do supporting statements with proof points (from, e.g., policies, organizational websites, account details, et cetera). Quantification, or identification of a quality level, by authenticity module 136 can rely on scripts, word recognition (individually or in phrases), real-time user responses, survey responses, natural language processing, artificial intelligence or machine learning, et cetera, in conjunction with definitions database 118 or using separate functionality.

Grounded module 138 determines whether the interaction conveys a mission-focused, reassuring, and professional tone. MSRs convey this groundedness by projecting confidence and commitment and demonstrating an organizational culture that supports the confidence of parties with whom MSRs interact. Expressing commitment to resolution and core values improve a stability score while arrogance, inflexibility, or unwillingness to compromise diminish a stability score. Quantification, or identification of a quality level, by grounded module 138 can rely on scripts, word recognition (individually or in phrases), real-time user responses, survey responses, natural language processing, artificial intelligence or machine learning, et cetera, in conjunction with definitions database 118 or using separate functionality.

In an embodiment, execution module 140 can generate one or more score components based on execution based on interaction data. Execution module 140 can include or interact with discipline module 142 and completeness module 144.

Discipline module 142 determines whether an interaction is disciplined and secure based on process adherence (e.g., governance and regulatory controls) and data security. Such aspects are recognized based on timely and uniform responses across teams and business units, adherence to processes and procedures, acknowledgment of and adherence to regulatory and compliance requirements, protection of personally identifiable information (PII) as well as account details (e.g., claim information, litigation), and proper use of flagging, tagging (including but not limited to sentiment tagging), and routing. Discipline scores are improved through process excellence and procedural alignment with a focus on regulatory adherence, data security, and protection of the interests of the users with whom the MSR interacts. Quantification, or identification of a quality level, by discipline module 134 can rely on scripts, word recognition (individually or in phrases), real-time user responses, survey responses, natural language processing, artificial intelligence or machine learning, et cetera, in conjunction with definitions database 118 or using separate functionality. Further, rules, checklists, scored goals or objectives, process adherence, et cetera, can impact discipline scores.

Completeness module 144 determines whether an interaction provides a complete answer or resolution and any additional advice or interaction desired. Aspects assessed here include whether the issue or interaction is completely resolved and closed when applicable, whether the resolution was apparent and public (e.g., if visibility is desired such as some circumstances where the interaction begins with a public post), and whether the fullest answer possible was provided with any additional information. In embodiments, completeness module 144 can also confirm that MSRs only respond to interactions in desired situations (e.g., avoiding "trolls," competitors, or interactions with negative implications or which could result in bad publicity). Quantification, or identification of a quality level, by completeness module 144 can rely on scripts, word recognition (individually or in phrases), real-time user responses, survey responses, natural language processing, artificial intelligence or machine learning, et cetera, in conjunction with definitions database 118 or using separate functionality. Further, rules, checklists, scored goals or objectives, process adherence, et cetera, can impact completeness scores.

To determine whether interactions are, e.g., intelligent, warm, genuine, stable, disciplined, and complete, various modules can consult definitions database 118. Definitions database 118 can include, e.g., key terms, scripts, rules for language processing and analysis, and various other rules or parameters (which can be qualitative or quantitative) used to analyze past or ongoing interaction data. Artificial intelligence, machine learning, natural language processing, searching or querying, computational linguistics, modeling (e.g., statistics-based or rule-based) and other technologies can be used by various modules to recognize and analyze text, speech, or multimedia. In embodiments, machine vision, image recognition, and/or related analysis can be used to assess nonverbal elements of communication where available.

Interaction data can be collected over open (e.g., public post) or closed (e.g., direct message) channels in one or more social media networks. The interaction data can be scored quantitatively (e.g., 0 or 1, 1 to 5, 1 to 10, −10 to 10, et cetera) or qualitatively (pass or fail, red/yellow/green, poor/fair/good/excellent, et cetera).

Interactions can be conducted in multiple languages and a translation service can be leveraged or integrated into, e.g., input module 112. Further, in embodiments, both MSR and third party communications are collected and analyzed, and scores can be made interdependent (e.g., deliberately belligerent competitor scores low in various scores, modifying scoring for MSR).

Figure 2:
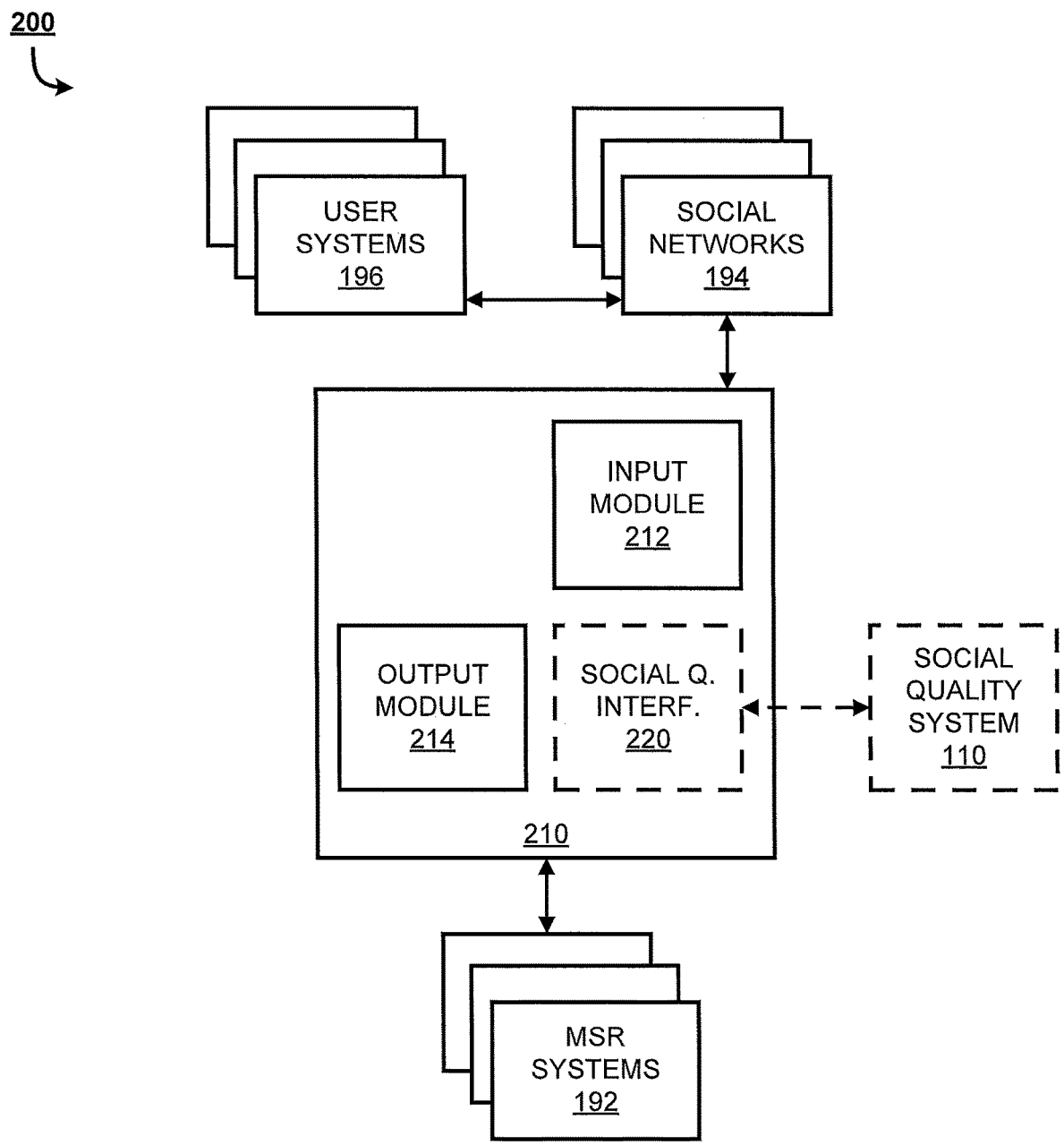
FIG. 2 illustrates a block diagram of an example system of the disclosure.

FIG. 2 illustrates an example system 200 including social media management platform 210 for use with social quality review platform 110. System 200 includes user systems 196 interacting with social networks 194. Social networks 194 are managed on the MSR-side by social network management platform 210, which interacts with MSR systems 192 and social networks 194.

Social network management platform 210 includes input module(s) 212, which receive information from at least social networks 194, and output modules 214, which transmit information from social network management platform 210 to social networks 194 and MSR systems 192. In embodiments, social network management platform 210 can include other modules to assist with management of social networks. In embodiments, social network management platform 210 can be an existing vendor-provided platform, such as those provided under the Lithium® brand by Lithium Technologies, Inc.

In embodiments, social network management platform 210 includes a social quality interface 220 for interacting with social quality review platform 110. In alternative embodiments, social quality review platform 110 can be a "built-in" aspect of social network management platform 210. In this fashion interaction quality can be managed with a social network management platform 210 as an integrated aspect or a plug-in or add-on. Such aspects do not limit standalone implementation of social quality review platform 110 separate from any social network management platform 210.

Figure 3:
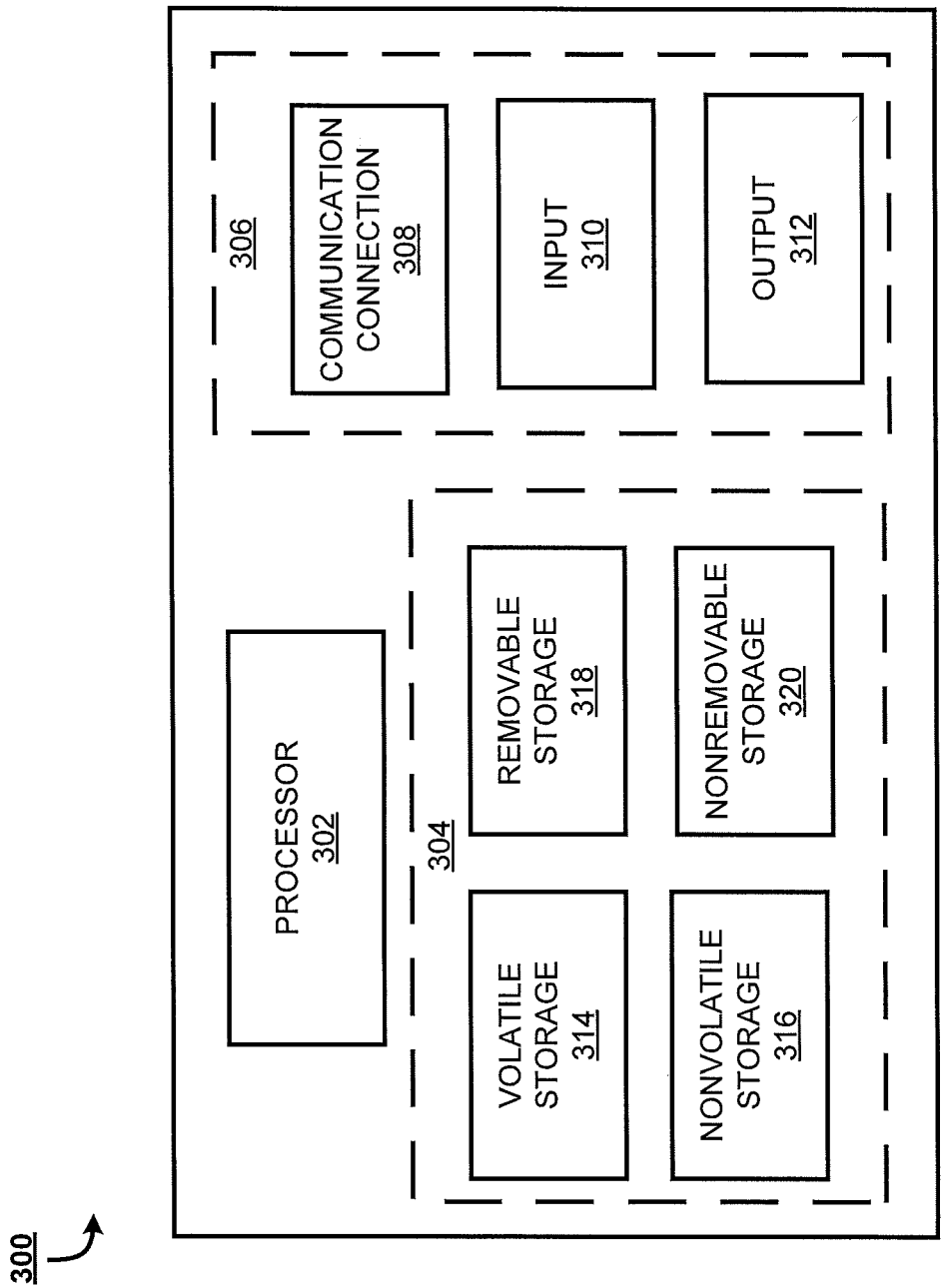
FIG. 3 is a block diagram illustrating an example implementation of a device which can be utilized in conjunction with or comprise a portion of systems disclosed.

FIG. 3 illustrates a device 300. Device 300 may comprise all or a part of modules or components herein. Device 300 may comprise hardware or a combination of hardware and software. The functionality to facilitate telecommunications via a telecommunications network may reside in one or combinations of links, portals, or connections. Device 300 depicted in FIG. 3 may represent or perform functionality of an appropriate device 300, or combination of modules or components herein. It is emphasized that the block diagram depicted in FIG. 3 is example and not intended to imply a limitation to a specific implementation or configuration. Thus, device 300 may be implemented in a single device or multiple devices. Multiple network entities may be distributed or centrally located. Multiple network entities may communicate wirelessly, via hard wire, or any appropriate combination thereof.

Device 300 may comprise a processor 302 and a memory 304 coupled to processor 302. Memory 304 may contain executable instructions that, when executed by processor 302, cause processor 302 to effectuate operations associated with aspects disclosed herein. As evident from the description herein, device 300 is not to be construed as software per se.

In addition to processor 302 and memory 304, device 300 may include an input/output system 306. Processor 302, memory 304, and input/output system 306 may be coupled together (coupling not shown in FIG. 3) to allow communications there between. Each portion of device 300 may comprise circuitry for performing functions associated with each respective portion. Thus, each portion may comprise hardware, or a combination of hardware and software. Accordingly, each portion of device 300 is not to be construed as software per se. Input/output system 306 may be capable of receiving or providing information from or to a communications device or other network entities configured for telecommunications. For example input/output system 306 may include a wireless communications (e.g., WiFi/2.5G/3G/4G/GPS) card. Input/output system 306 may be capable of receiving or sending video information, audio information, control information, image information, data, or any combination thereof. Input/output system 306 may be capable of transferring information with device 300. In various configurations, input/output system 306 may receive or provide information via any appropriate means, such as, for example, optical means (e.g., infrared), electromagnetic means (e.g., RF, WiFi, Bluetooth®, ZigBee®), acoustic means (e.g., speaker, microphone, ultrasonic receiver, ultrasonic transmitter), or a combination thereof. In an example configuration, input/output system 306 may comprise a WiFi finder, a two-way GPS chipset or equivalent, or the like, or a combination thereof.

Input/output system 306 of device 300 also may contain communication connection 308 that allows device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with aspects described herein. For example, processor 302 may be capable of, in conjunction with any other portion of device 300, managing social media communications as described herein.

Memory 304 of device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by device 300. Memory 304 may comprise executable instructions that, when executed by processor 302, cause processor 302 to effectuate operations for, e.g., listening to social media activity.

Figure 4:
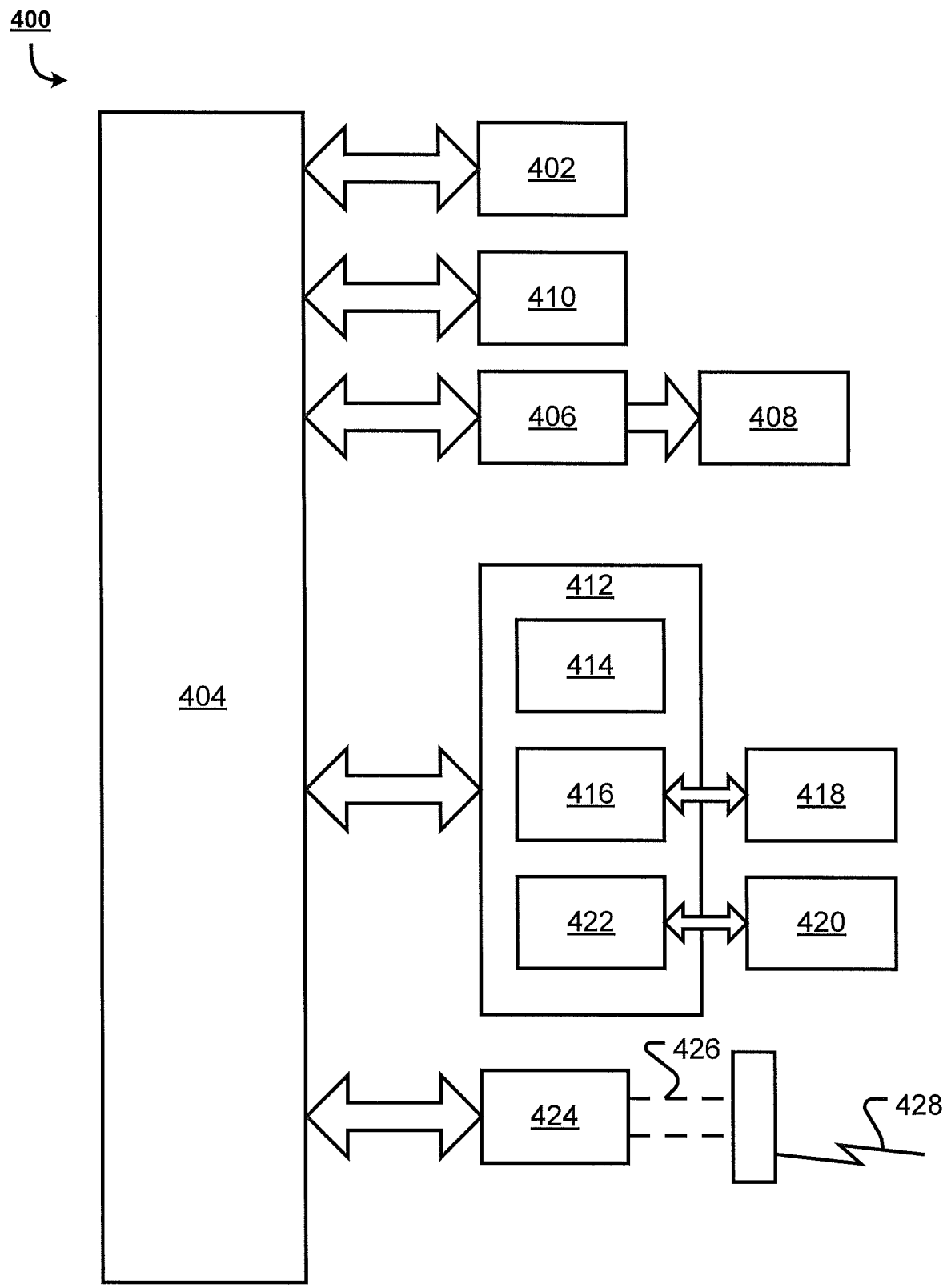
FIG. 4 is a block diagram of a computer system that be used to implement at least a portion of aspects herein.

FIG. 4 illustrates a computer-based system 400 that may constitute or include parts of one or more of aspects of, e.g., FIGS. 1 and/or 2, or device 300. Computer-based system 400 includes at least one processor, such as a processor 402. Processor 402 may be connected to a communication infrastructure 404, for example, a communications bus, a crossover bar, a network, or the like. Various software aspects are described in terms of this example computer-based system 400. Upon perusal of the present description, it will become apparent to a person skilled in the relevant art(s) how to implement the present disclosure using other computer systems or architectures.

Computer-based system 400 includes a display interface 406 that forwards graphics, text, or other data from communication infrastructure 404 or from a frame buffer (not shown) for display on a display unit 408.

Computer-based system 400 further includes a main memory 410, such as random access memory (RAM), and may also include a secondary memory 412. Secondary memory 412 may further include, for example, a hard disk drive 414 or a removable storage drive 416, representing a floppy disk drive, a magnetic tape drive, an optical disk drive, etc. Removable storage drive 416 reads from or writes to a removable storage unit 418 in a well-known manner. Removable storage unit 418 may represent a floppy disk, magnetic tape, or an optical disk, and may be read by and written to by removable storage drive 416. As will be appreciated, removable storage unit 418 includes a computer usable storage medium having computer software or data stored therein.

In accordance with various aspects of the present disclosure, secondary memory 412 may include other similar devices for allowing computer programs or other instructions to be loaded into computer-based system 400. Such devices may include, for example, a removable storage unit 420 and an interface 422. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from removable storage unit 420 to computer-based system 400.

Computer-based system 400 may further include communication interface 424. Communication interface 424 may allow software or data to be transferred between computer-based system 400 and external devices. Examples of communication interface 424 include, but may not be limited to a modem, a network interface (such as an Ethernet card), a communications port, a Personal Computer Memory Card International Association (PCMCIA) slot and card, or the like. Software or data transferred via communication interface 424 may be in the form of a number of signals, hereinafter referred to as signals 426, which may be electronic, electromagnetic, optical or other signals capable of being received by communication interface 424. Signals 426 may be provided to communication interface 424 via a communication path (e.g., channel) 428. Communication path 428 carries signals 426 and may be implemented using wire or cable, fiber optics, a telephone line, a cellular link, a radio frequency (RF) link, or other communication channels.

In this document, the terms "computer program medium" and "computer usable medium" are used to generally refer to media such as removable storage drive 416, a hard disk installed in hard disk drive 414, or the like. These computer program products provide software to computer-based system 400. The present disclosure is directed to such computer program products.

Computer programs (also referred to as computer control logic) may be stored in main memory 410 or secondary memory 412. The computer programs may also be received via communication interface 404. Such computer programs, when executed, enable computer-based system 400 to perform the functions consistent with the present disclosure, as discussed herein. In particular, the computer programs, when executed, enable processor 402 to perform the features of the present disclosure. Accordingly, such computer programs represent controllers of computer-based system 400.

In accordance with an aspect of the present disclosure, where the disclosure is implemented using a software, the software may be stored in a computer program product and loaded into computer-based system 400 using removable storage drive 416, hard disk drive 414, or communication interface 424. The control logic (software), when executed by processor 402, causes processor 402 to perform the functions of the present disclosure as described herein.

In another aspect, the present disclosure is implemented primarily in hardware using, for example, hardware components, such as application specific integrated circuits (ASIC). Implementation of the hardware state machine to perform the functions described herein will be apparent to persons skilled in the relevant art(s). In yet another aspect, the present disclosure is implemented using a combination of both the hardware and the software. In another aspect, the present disclosure is implemented using software.

Various aspects disclosed herein are to be taken in the illustrative and explanatory sense, and should in no way be construed as limiting of the present disclosure. All numerical terms, such as, but not limited to, "first" and "second" or any other ordinary or numerical terms, should also be taken only as identifiers, to assist the reader's understanding of the various aspects, variations, components, or modifications of the present disclosure, and may not create any limitations, particularly as to the order, or preference, of any aspect, variation, component or modification relative to, or over, another aspect, variation, component or modification.

It is to be understood that individual features shown or described for one aspect may be combined with individual features shown or described for another aspect. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

The present disclosure is described herein with reference to system architecture, block diagrams, flowchart illustrations of methods, and computer program products according to various aspects of the disclosure. It will be understood that each functional block of the block diagrams and the flowchart illustrations, and combinations of functional blocks in the block diagrams and flowchart illustrations, respectively, can be implemented by computer program instructions.

These software elements may be loaded onto a general-purpose computer, special-purpose computer, or other programmable data processing apparatus to produce a machine, such that the instructions that execute on the computer or other programmable data-processing apparatus create means for implementing the functions specified in the flowchart block or blocks. These computer program instructions may also be stored in a computer-readable memory that can direct a computer or other programmable data-processing apparatus to function in a particular manner, such that the instructions stored in the computer-readable memory produce an article of manufacture including instruction means that implement the function specified in the flowchart block or blocks. The computer program instructions may also be loaded onto a computer or other programmable data-processing apparatus to cause a series of operational steps to be performed on the computer or other programmable apparatus to produce a computer-implemented process, such that the instructions that execute on the computer or other programmable apparatus provide steps for implementing the functions specified in the flowchart block or blocks. In an aspect, the computer program instructions may be executed on any remote-hosted application framework, for example, by a processor associated with a cloud server.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, websites, web forms, prompts, etc. Practitioners will appreciate that the illustrated steps described herein may comprise in any number of configurations including the use of windows, web pages, hypertexts, hyperlinks, web forms, popup windows, prompts, and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Figure 5:
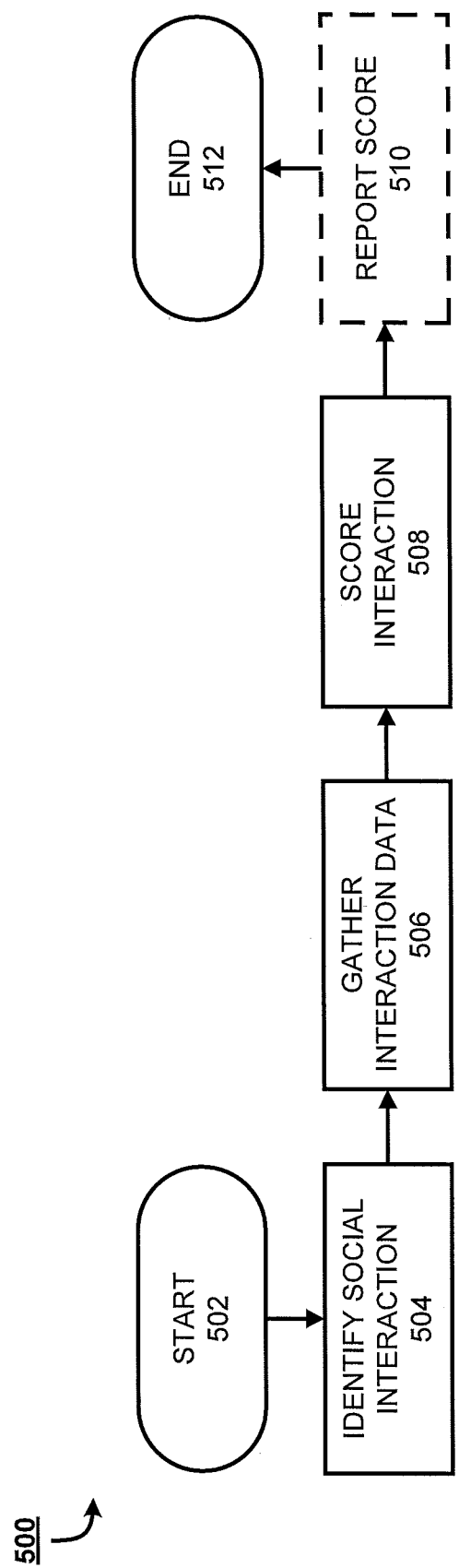
FIG. 5 is a flowchart of an example methodology disclosed herein.

FIG. 5 illustrates an example methodology 500 for providing an interaction quality score. Methodology 500 starts at 502 and proceeds to 504 where a social interaction between a member services representative and an entity on a social media network is identified. Based on the identification and ongoing conversation, interaction data is gathered. Analysis of the interaction data can occur on an ongoing, real-time basis, at particular points during the interaction, or at the conclusion of the interaction. Based on the interaction data and social scoring criteria, an interaction quality score can be generated at 506. In some embodiments, at 508, the interaction quality score, or a report based thereon, can be provided to a user at 508. Thereafter, at 510, methodology 500 ends.

FIGS. 6A to 6E, FIGS. 7A to 7E, and FIGS. 8A to 8E illustrate aspects of a user interface disclosed herein. An interface facilitating use of systems and methods disclosed herein can include, e.g., a conversation details pane 610, a conversation content pane 620 (e.g., displaying some or all of the conversation, portions of the conversation, summaries of the conversation, et cetera), and a quality review pane 630 including scores (e.g., numeric), grades (e.g., lettered or otherwise) or indicators (e.g., color-coded) describing MSR performance during the conversation in terms of intelligence, warmth, authenticity, groundedness, discipline, and completeness.

In embodiments, a conversation details pane 610 can describe one or more platforms (e.g., social networks 194) used during the conversation. In embodiments, conversations with the same party across multiple platforms can be merged. Conversation details pane 610 can further include a date, time, duration, subject, and the identities of parties in the conversation.

In embodiments, conversation content pane 620 can include the content of conversations, which can be provided as in various manners with various modifications (emphasized, annotated, highlighted, coded, et cetera) in native (e.g., content or image from platform), plain text, or other formats. Conversation content pane 620 can be partitioned into multiple communications, or turns or transmissions from parties within a single communication. In embodiments, conversation content pane 620 can include various icons or controls. Icons 622 can include feedback regarding specific portions of the conversation, where one or more parties (the MSR, one or more parties communicating with an MSR, or others such as an MSR manager or third party) in a conversation has indicated a sentiment (e.g., happy, neutral, sad). Controls can include, e.g., buttons 624 or 626 which can be used to expand one or more portions of a conversation from a collapsed or condensed arrangement, or pop out one or more portions of the conversation into a new window. In an embodiment, one or more of buttons 624 or 626 can provide an interface to respond to or continue the conversation (where such functionality is not a static portion of interface 600). Conversation content pane 620 can include details regarding individual portions of conversation, such as send or receive time 627 and tags 628. Tags may be automatically populated or added by one of the parties to the conversation.

Quality review pane 630 can include a tabulated format for the categories assessed using, e.g., tone or execution assessment techniques described herein. The tabulated format can describe a category of performance and adjacently show a score, grade, or indicator. In embodiments, a composite or total score or grade can sum or aggregate the component grades. In embodiments, scores, grades, or indicators are static and shown at the end of a conversation or fixed milestones. In alternative embodiments, scores, grades, or indicators are dynamic and develop during a conversation depending on the performance of the MSR.

Figure 6B:
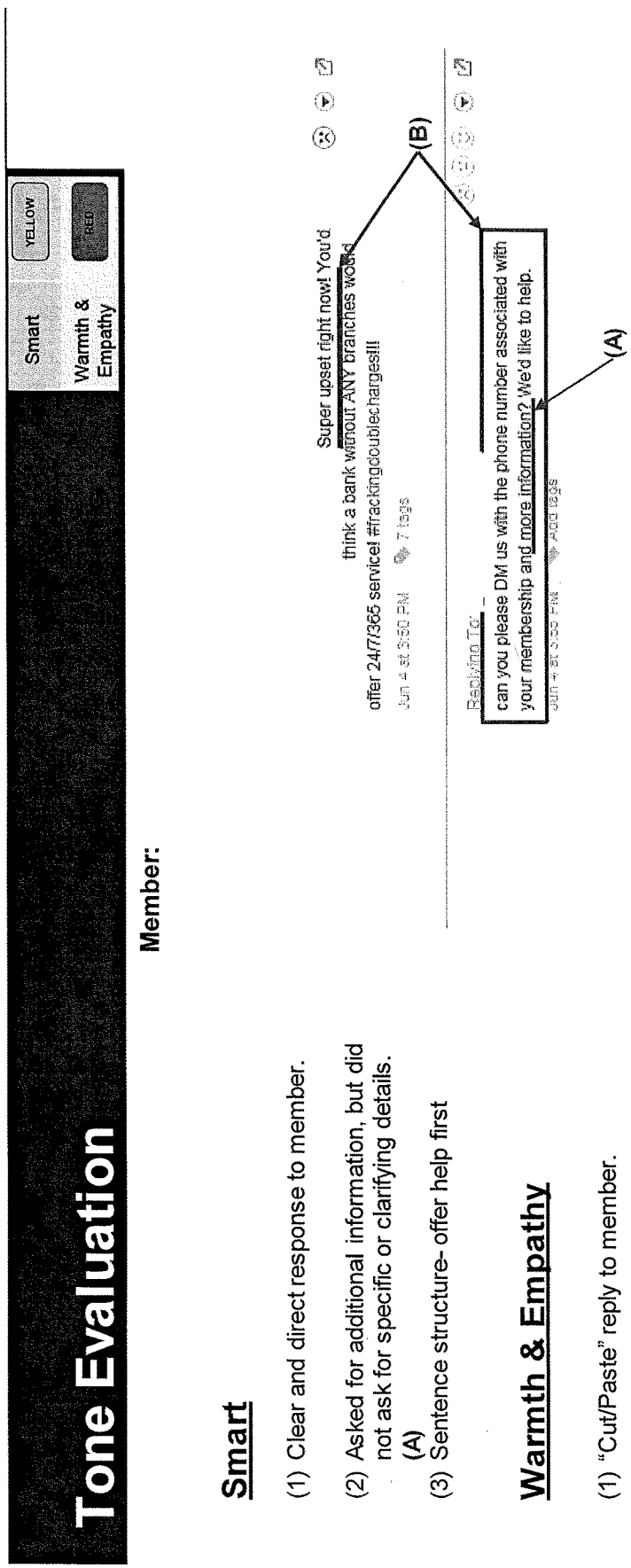
Figure 6C:
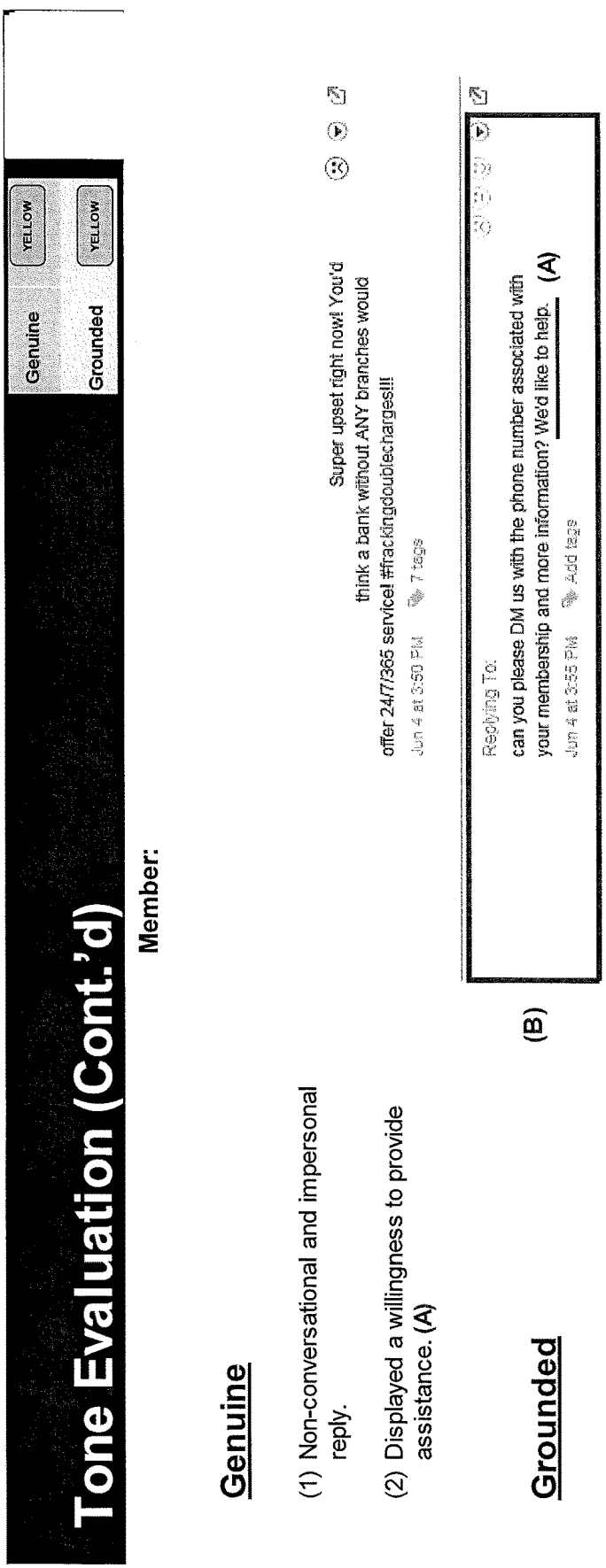

FIGS. 6B and 6C illustrate example tone evaluation interface 640 (and/or 640'). In embodiments, tone evaluation interface 640 and 640' are shown simultaneously; in alternatives, they may be distinct displays. Tone evaluation interface 640 (and/or 640') can include an indicator 641 to describe which components of tone are being discussed. Feedback 642 and 644 can correspond to some or all of conversation segments 643 or 645 (or any other portion of conversation, or provide a summary for the conversation). Static (when already evaluated) or dynamic (to allow for after-conversation evaluation) icons or controls can be provided with conversation segments as in other portions of user interfaces disclosed herein. Tone evaluation interface 640' shows feedback 646 and 648 which can correspond to some or all of conversation segments 647 and 649 (or any other portion of conversation, or provide a summary for the conversation)

Figure 6D:
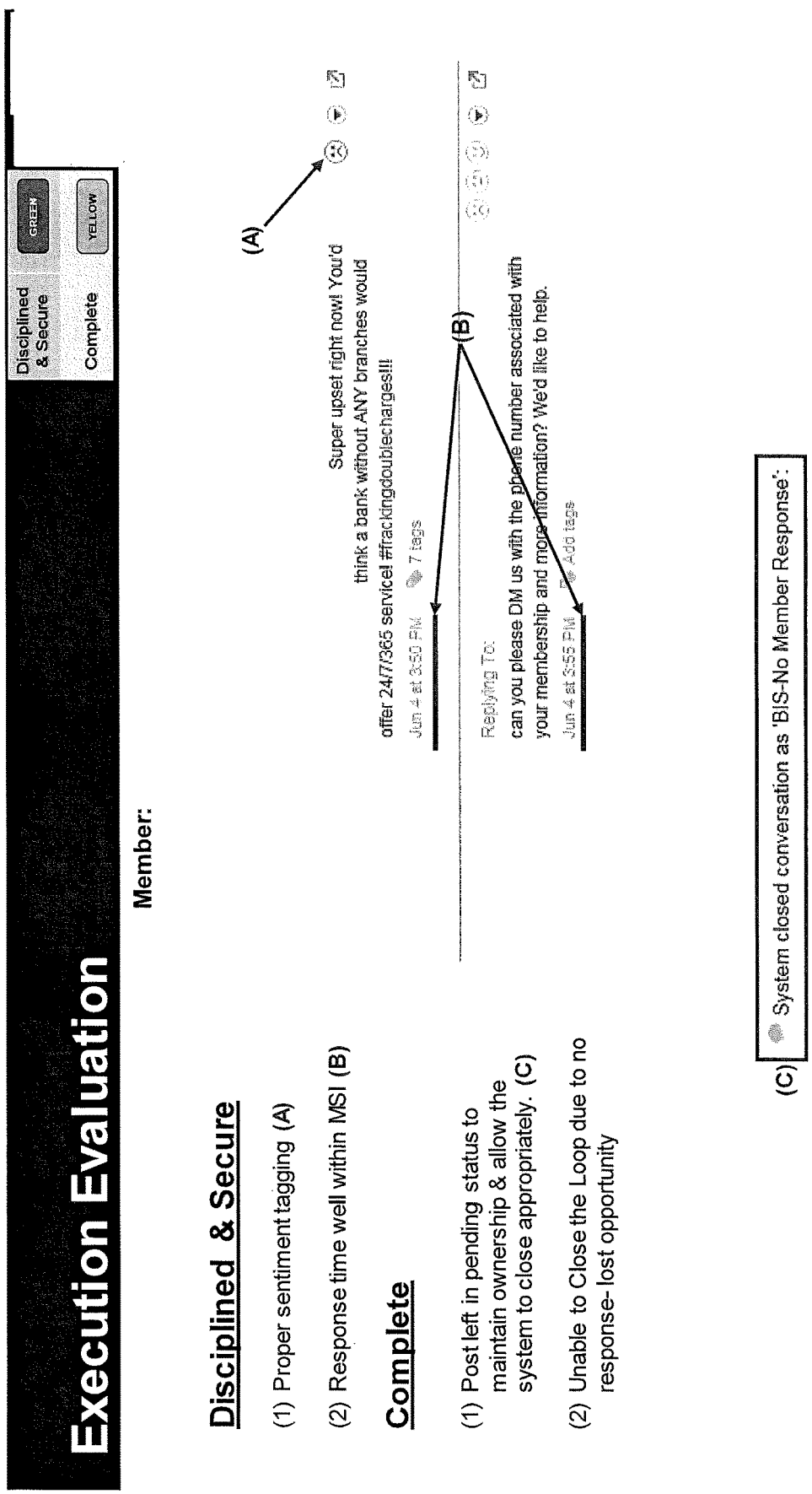
Figure 7B:
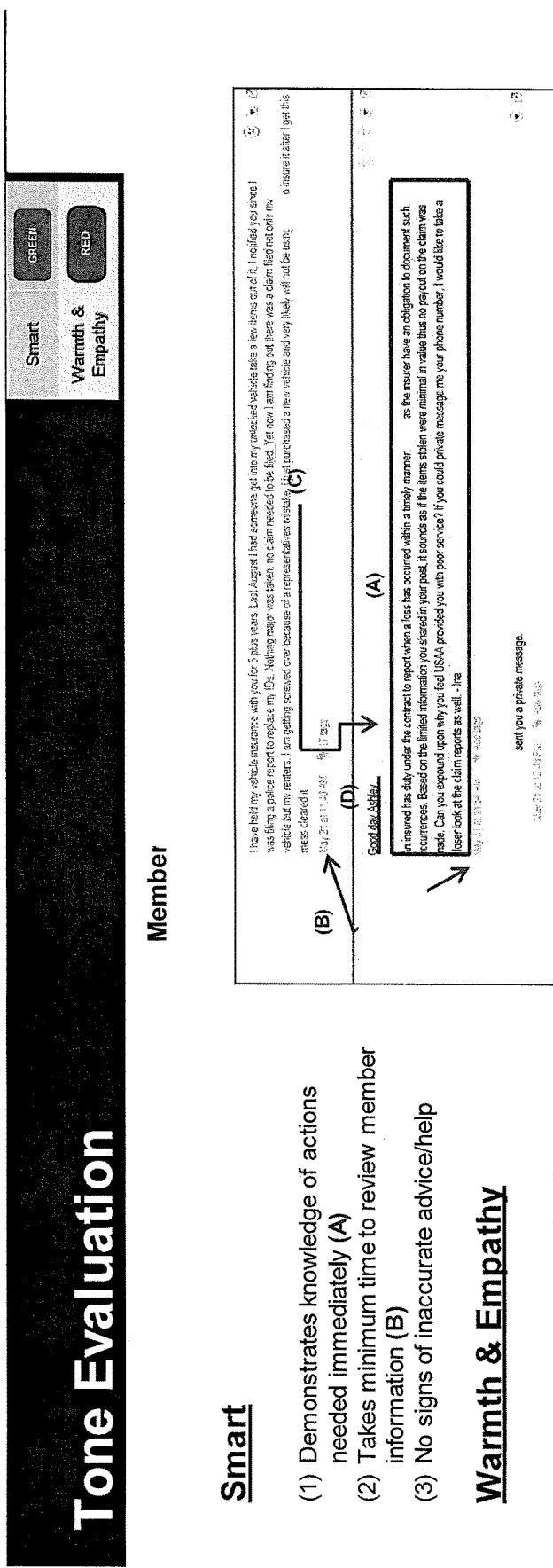
Figure 7C:
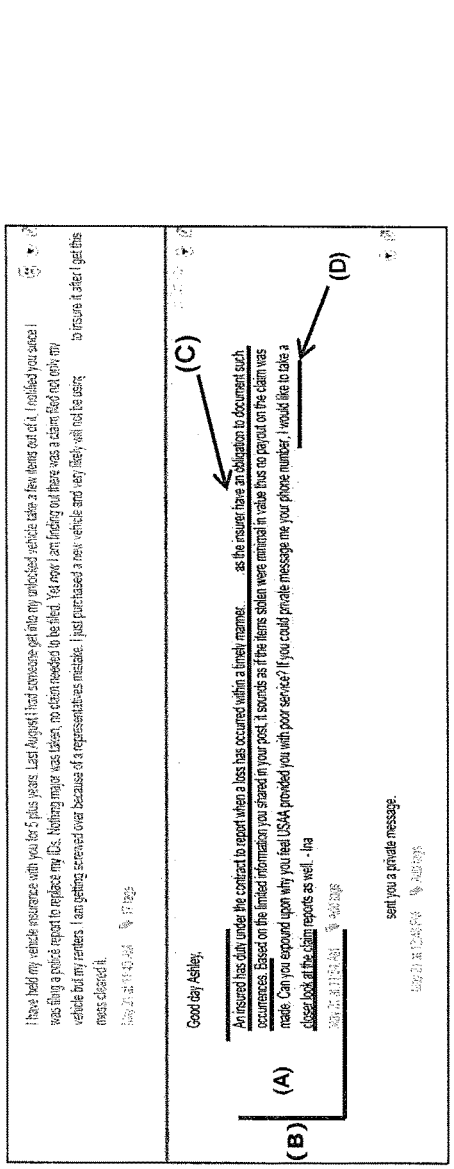
Figure 7D:
Figure 8B:
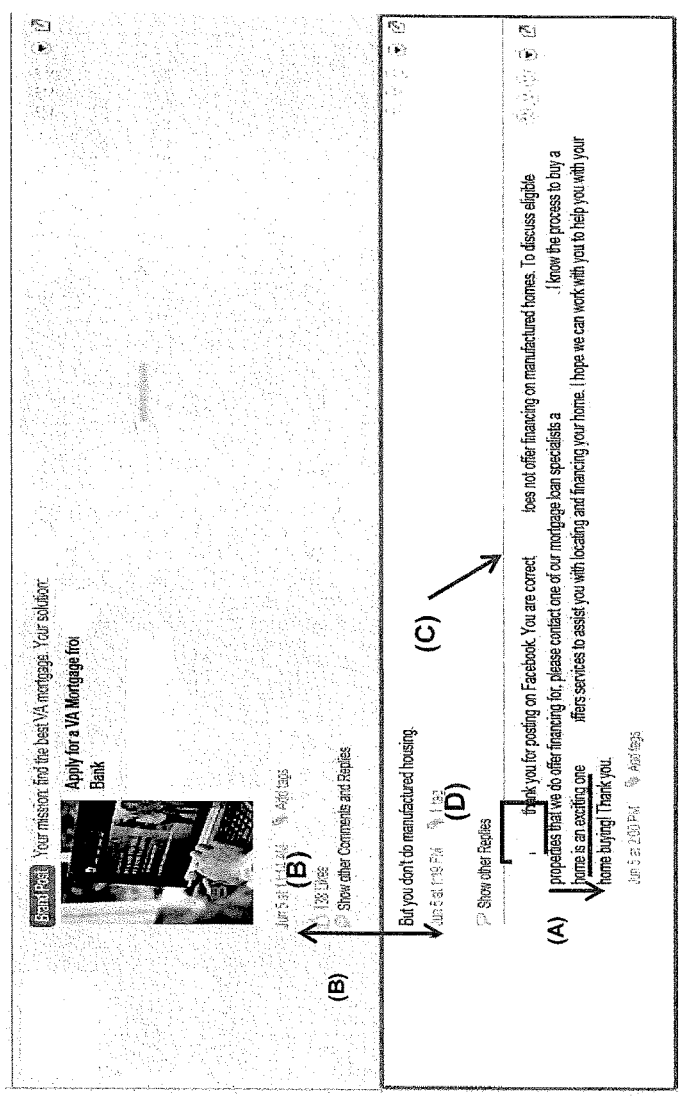
Figure 8D:
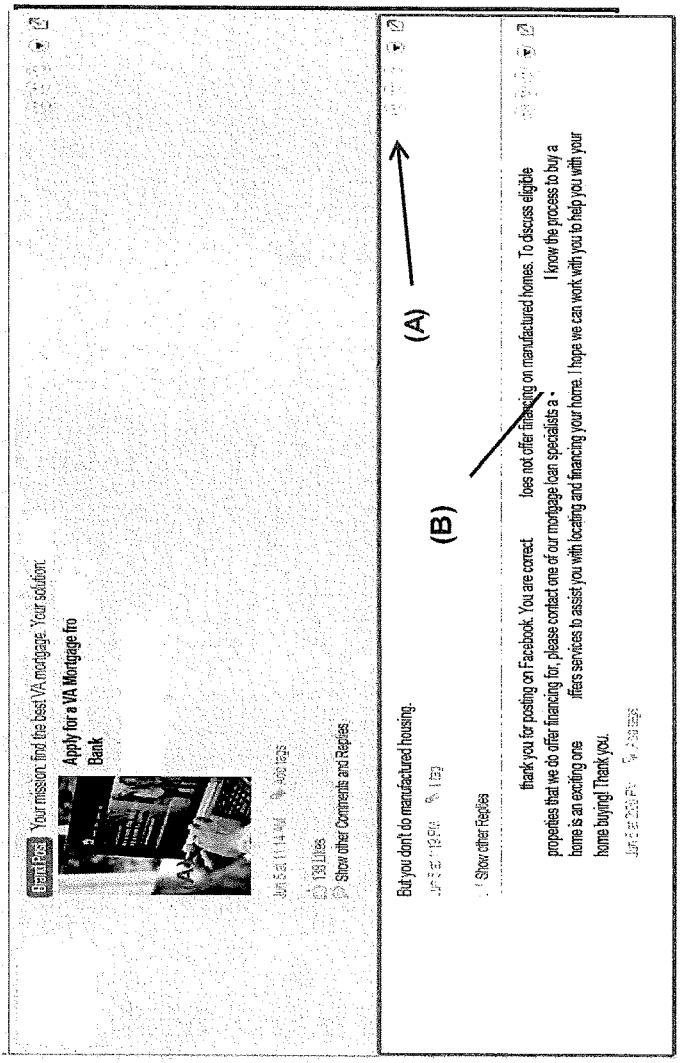

FIG. 6D illustrates example execution evaluation interface 650. Execution evaluation interface can include an indicator 651 to describe which components of execution are being discussed. Feedback 652 and 654 can correspond to some or all of conversation segments 655 and 656 (or any other portion of conversation, or provide a summary for the conversation). Conversation segments or conversations can be reproduced in various forms and annotated. Resolution 658 can describe the result or termination of the conversation to which conversation segments 655 and 656 relate.

FIG. 6E illustrates a conclusion interface 660 which includes key observations and notes 661 generated to reinforce behavior improving tone or execution scores and correct behavior limiting tone or execution scores. One or more key observations and notes 661 can be provided, which can relate to various rules, scripts, or other details.

FIGS. 7A to 7E and FIGS. 8A to 8E include examples of aspects such as those discussed in conjunction with FIGS. 6A to 6E with alternative data, conversations, feedback, et cetera.

While these figures FIGS. 6A to 6E, FIGS. 7A to 7E, and FIGS. 8A to 8E provide specific examples and grading criteria, they are provided for purposes of example only, and should not be assessed as limiting in any manner. For example, while a color-coded grading scale is shown based on particular rules, a numeric or quantitative grading scale based on the same or different rules is embraced according this disclosure.

The systems, methods and computer program products disclosed in conjunction with various aspects of the present disclosure are embodied in systems and methods for facilitating multiple types of communications in systems and networks discussed herein.

Methodologies herein are described with specific aspects for ease of explanation with respect to various embodiments. However, methodologies embraced under the scope and spirit of the disclosure may vary, to include excluding particular aspects or comparisons described.

While aspects of the present disclosure have been particularly shown and described with reference to the examples above, it will be understood by those skilled in the art that various combinations of the disclosed aspects or additional aspects may be contemplated by the modification of the disclosed machines, systems and methods without departing from the spirit and scope of what is disclosed. Such aspects should be understood to fall within the scope of the present disclosure as determined based upon the claims and any equivalents thereof.

What is claimed is:

1. A system, comprising:
   a non-transitory computer-readable medium storing instructions that when executed by a processor are configured to effectuate:
   a social network interface module configured to receive interaction data from at least one social network, wherein the interaction data includes communications from a member services representative to a user of the social media network;
   an interaction database configured to store the interaction data;
   a scoring module configured to generate an interaction quality score between the member services representative and the user of a social media network by aggregating a tone score and an execution score based on the interaction data, the scoring module comprising:
   a definitions database configured to store one or more definitions informing a tone score and one or more definitions informing an execution score;
   a tone module of the scoring module configured to generate the tone score by analyzing the communications from a member services representative using machine learning and the one or more definitions for one or more tone components associated with a professional tone; and
   an execution module of the scoring module configured to generate the execution score by analyzing the communications from a member services representative using machine learning and the one or more definitions informing the execution score, wherein the execution score is based on adherence to a process satisfying compliance obligations by the member services representative, wherein the compliance obligations include a data security requirement;
   a portal module configured to provide the interaction quality score to at least the member services representative; and
   a revision module configured to generate revisions to the interaction data based on the tone score or the execution score.

2. The system of claim 1, wherein the instructions when executed by the processor are configured to effectuate at least a portion of a social media network.

3. The system of claim 1, wherein the instructions when executed by the processor are configured to effectuate:
   an output module configured to provide an indicator of the interaction quality score through a member service representative application.

4. The system of claim 1, wherein the instructions when executed by the processor are configured to effectuate a social media management platform configured to communicate with one or more social media networks.

5. The system of claim 4, wherein system is a portion of the social media management platform.

6. The system of claim 4, wherein the instructions when executed by the processor are configured to effectuate a social quality review interface configured to facilitate interoperability between the system and the social media management platform.

7. The system of claim 1, wherein the interaction data is multimedia.

8. The system of claim 1, wherein the interaction data is received over an open channel.

9. The system of claim 1, wherein the interaction data is received over a private channel.

10. The system of claim 1, wherein the instructions when executed by the processor are configured to effectuate a social quality database configured to store the interaction quality score.

11. The system of claim 1, wherein the instructions when executed by the processor are configured to effectuate a portal module configured to provide the interaction quality score to one or more users.

12. The system of claim 11, wherein the portal module is configured to aggregate a plurality of social quality scores and provide statistics related to the plurality of social quality scores to one or more users.

13. A computer-implemented method, comprising executing by a processor code stored on a non-transitory computer-readable medium, wherein execution of the code causes:
   identifying a social communication between a member services representative and a user of a social network;
   storing interaction data in an interaction database, wherein the interaction data includes communications from the member services representative to the user of the social media network;
   gathering interaction data from the social communication;

generating a tone score by analyzing the communications from a member services representative, wherein the tone score is based on adherence to at least one definition for one or more components associated with a professional tone;

generating an execution score by analyzing the communications from a member services representative, wherein the execution score is based on adherence to a process satisfying compliance obligations by the member services representative, wherein the compliance obligations include a data security requirement;

generating an interaction quality score based on the tone score and the execution score;

providing a portal module configured to provide the interaction quality score to one or more users; and generating revisions to the interaction data based on the tone score or the execution score.

14. The computer-implemented method of claim 13, wherein execution of the code causes:

providing the interaction quality score during an interaction between the member service representative and a user, wherein the interaction data is representative of the interaction.

15. The computer-implemented method of claim 14, wherein the interaction quality score is provided in real-time.

16. A non-transitory computer-readable medium storing instructions that when executed by a processor perform a method comprising:

identifying a social communication between a member services representative and a user of a social network;

storing interaction data in an interaction database, wherein the interaction data includes communications from the member services representative to the user of the social media network;

gathering interaction data from the social communication;

generating a tone score by analyzing the communications from a member services representative, wherein the tone score is based on adherence to at least one definition for one or more components associated with a professional tone;

generating an execution score by analyzing the communications from a member services representative, wherein the execution score is based on adherence to a process satisfying compliance obligations by the member services representative, wherein the compliance obligations include a data security requirement;

generating an interaction quality score based on the tone score and the execution score;

providing a portal module configured to provide the interaction quality score to one or more users; and generating revisions to the interaction data based on the tone score or the execution score.

17. The non-transitory computer-readable medium of claim 16, wherein the method comprises:

providing an indicator of the interaction quality score through a member service representative application.

18. The non-transitory computer-readable medium of claim 16, wherein the method comprises:

communicating with one or more social media networks; and facilitating interoperability with a social media management platform.

\* \* \* \* \*